(12) United States Patent
Welch (10) Patent No.: US 8,888,565 B2
(45) Date of Patent: Nov. 18, 2014

(54) SHARPENING TOOL, SHARPENING SYSTEM AND KIT

(71) Applicant: Glenn S. Welch, Gilford, NH (US)

(72) Inventor: Glenn S. Welch, Gilford, NH (US)

(73) Assignee: Welch Manufacturing Technologies, Ltd, Laconia, NH (US)

(*) Notice: Subject to any disclaimer, the term of this patent is extended or adjusted under 35 U.S.C. 154(b) by 148 days.

(21) Appl. No.: 13/681,663

(22) Filed: Nov. 20, 2012

(65) Prior Publication Data

US 2014/0141702 A1    May 22, 2014

(51) Int. Cl.
  *B24D 5/16*    (2006.01)
  *B62B 17/00*   (2006.01)
  *B24B 23/02*   (2006.01)

(52) U.S. Cl.
  CPC ............. *B62B 17/00* (2013.01); *B24B 23/02* (2013.01); *B24D 5/16* (2013.01)
  USPC ............................... 451/358; 451/462; 76/82

(58) Field of Classification Search
  USPC ......... 451/358, 547, 541, 349, 462; 76/82, 83
  See application file for complete search history.

(56) References Cited

U.S. PATENT DOCUMENTS

| 4,800,686 | A  | * | 1/1989 | Hirabayashi et al. | ........... 451/41 |
| 6,220,938 | B1 | * | 4/2001 | Stocker et al. | ................. 451/49 |
| 6,739,954 | B2 | * | 5/2004 | Stocker | ......................... 451/57 |

* cited by examiner

*Primary Examiner* — Robert Rose
(74) *Attorney, Agent, or Firm* — Michael J. Persson; Catherine E. Napjus; Lawson Persson & Weldon-Francke, PC (57) ABSTRACT

The present invention is a sharpening tool and sharpening system for sharpening snowmobile carbide wear rails and studs and a kit of parts that includes the sharpening tool and a steering member having a carbide wear rail. The sharpening tool is attachable to the chuck of a hand held drill and includes a shaft attachable to the chuck of the hand held drill and cylindrical head affixed to the shaft. The cylindrical head includes a rail groove surfaced in an abrasive material for sharpening wear rails.

19 Claims, 13 Drawing Sheets

SHARPENING TOOL, SHARPENING SYSTEM AND KIT

FIELD OF THE INVENTION

The present invention relates to sharpening snowmobile ski runners and studs, and in particular, to an easy-to-use and cost-efficient tool for sharpening snowmobile wear rails and studs.

BACKGROUND

Snowmobiling is a popular winter activity in cold climates. The steering of snowmobiles is conventionally accomplished by a pair of ground engageable skis which are mounted on the front of the snowmobile and are turned in the direction in which the snowmobile is to be propelled. Conventional ski runners merely slide along the surface of the snow without "digging in". This makes the snowmobile difficult to control in icy conditions, especially at high speeds, which greatly increases the danger of injury or death.

In order to increase the control of snowmobiles in icy conditions, ski runners have been developed that include carbide runners or skegs on the underside thereof, having sharp carbide wear rails that cut or bite into the hardened surface to positively control the turning of the snowmobile. Unfortunately, these ski runners lose their effectiveness once the carbide wear rails become dulled, rendering them as dangerous as conventional skis in icy conditions. Thus, either the carbide wear rails (skegs), or the entire ski needs to be replaced.

Figure 4A:
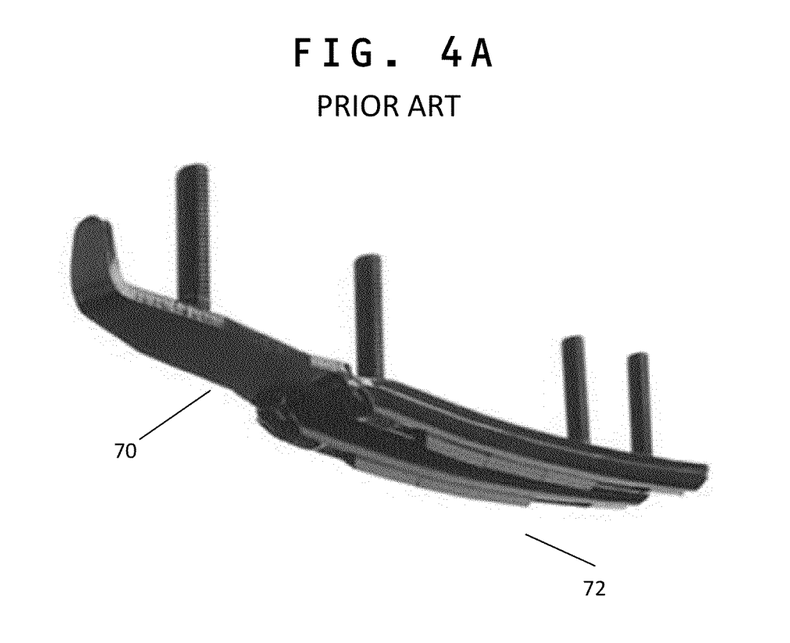
FIG. 4A is a perspective view of a prior art wear bar having two wear rails.
Figure 4B:
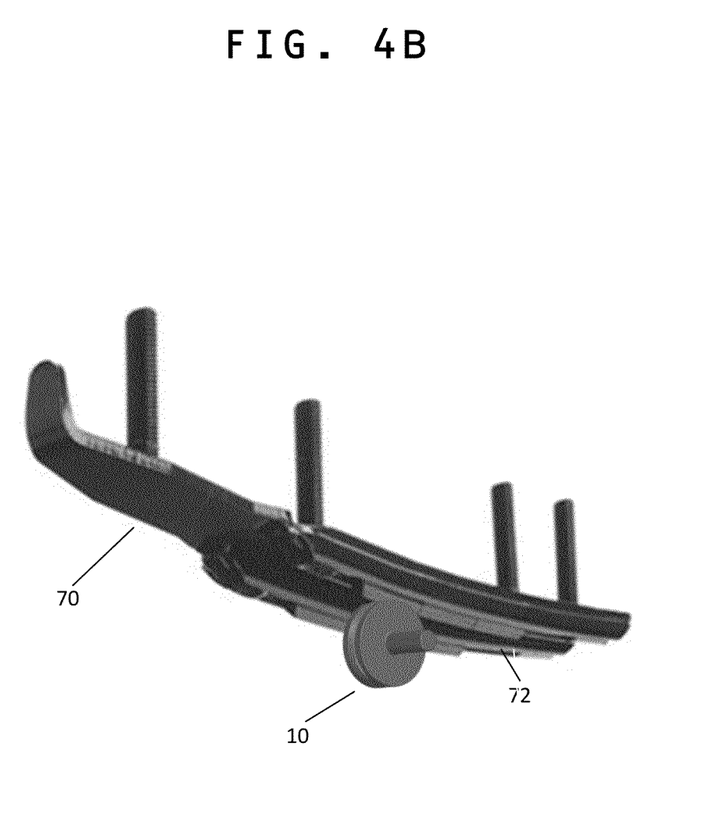
FIG. 4B is a perspective view of the sharpening tool of the present invention being applied to a wear rail of a wear bar having two wear rails.

In order to reduce the cost and inconvenience of ski runners having integral carbide rails, removable wear bars have been developed that may be attached to conventional ski runners to produce the same results. Examples of such wear bars are those sold by International Engineering & Manufacturing, Inc., of Hope, Mich., under the trademark "WOODY'S". One such wear bar is shown in FIGS. 4A & 4B and includes two sharpened carbide wear rails that are permanently installed within steel skegs. These wear bars are attached to the bottom surface of conventional skis and are removed when the carbide wear rails become dull and replaced with new ski runners. Once they become dull, these wear bars currently need to be discarded.

The need to replace skis or wear bars having dulled carbide wear rails has significant disadvantages. The cost of both ski runners and wear bars is significant, with a set of wear bars typically costing $120.00 or more. In addition, it is common for snowmobilers to spend multiple days touring on their machines. Thus, unless the snowmobiler packs a spare set of wear bars, there is a significant risk that they will be riding with dangerously dulled carbide wear rails by the end of their trip.

Therefore, there is a need for a way to maintain a sharp carbide wear rail on a ski or a wear bar that does not require that the wear rail or rail bar be replaced and that allows a user to sharpen the wear rail in the field.

SUMMARY OF THE INVENTION

The present invention is a sharpening tool for sharpening carbide wear rails on snowmobile ski runners and ski wear bars.

In its most basic form, the sharpening tool of the present invention includes a shaft and a substantially cylindrical head having an outer surface to which an abrasive material is disposed. The shaft and cylindrical head are preferably manufactured from the same steel alloy, preferably 4140 alloy. However, other alloys, such as 1018 steel alloy, or other materials commonly used in the art of rotating tools and to which the abrasive material may be disposed, may be used to achieve similar results.

The shaft is preferably a narrow cylinder attachable to a rotating power tool. In the preferred embodiment of the system, the shaft has a cylindrical shape and is gripped by the chuck of a hand held drill in the same manner as the chuck would grip a drill bit. However, in other embodiments, the shaft may have a hexagonal cross section for attachment to a quick connect hex driver, such as those found on drywall screw guns, or may take other art recognized forms. Regardless of how it is shaped or gripped, the shaft of the sharpening tool is rotated rapidly when the rotating power tool is energized in the same manner as a drill bit would be when mounted within the chuck of a hand held drill.

The preferred shaft is 1.3 inches long and has a diameter of 0.25 inches, which allows it to be gripped by chucks of most conventional hand held drills. The shaft is attached to the cylindrical head of the sharpening tool, preferably by brazing. However, in some embodiments, the shaft and cylindrical head are machined from a single bar of material. In embodiments in which the shaft is brazed to the cylindrical head, the full length of the shaft is preferably approximately 1.58 inches, with 0.375 inches brazed within the cylindrical head and only 1.3 inches extending out from the cylindrical head. It is preferred that the shaft and cylindrical head both be made of the same steel alloy, but other art recognized materials to which the abrasive material may be disposed may be substituted to achieve similar results.

The cylindrical head of the sharpening tool is a short wide cylinder when compared to the shaft. The cylindrical head has a body having a substantially round cross section with a face on either side of the body. The shaft extends from the center of one of the faces of the cylindrical head. The cylindrical head preferably has a diameter of 1.5 inches and a width of 0.637 inches. The diameter is the distance across the center of either of the faces of the cylindrical head. The width is the distance between the faces.

At least one rail groove runs around the circumference of the round body of the cylindrical head. In embodiments in which the sharpening tool has a single rail groove, the rail groove is preferably disposed at the midpoint between the two faces. The rail groove is V-shaped and is surfaced in an abrasive material, preferably 40/50 diamond grit. A wear rail to be sharpened will be placed in the rail groove and sharpened against the diamond grit surface. The V-shaped rail groove comes to a point with a preferable angle of between 60° and 80°. It is preferable that, partway between the point of the "V" of the rail groove and a second location where the rail groove meets the round body of the cylindrical head, the angle of the rail groove flares out into a wider angle. The wider angle is preferably approximately 120°.

Some embodiments of the sharpening tool of the present invention also include a stud sharpener. The stud sharpener includes a tube body extending from the center of the face of the cylindrical head from which the shaft does not extend. The tube body preferably has a length of 0.5 inches and a diameter of 0.75 inches. The inside of the tube body includes a stud groove. The stud groove is cylindrical, allowing for entry of the stud to be sharpened, and preferably comes to a point with an angle of 60°. Like the rail groove, the stud groove is surfaced with a sharpening surface, preferably 40/50 diamond grit. A stud to be sharpened is inserted in the stud groove and sharpened against the diamond grit surface. It is preferred that the stud sharpener is one integrated piece with the cylindrical head, but it may also be a separate piece that is brazed onto the cylindrical head. The point of the stud groove preferably extends into the cylindrical head.

The sharpening tool of the present invention, as described above, will sell at retail for approximately $50-$60. It may be used for sharpening 5-10 times before the surfaces of the rail groove and stud groove are worn too low from the grinding. The cost for each sharpening, therefore, may be as low as approximately $3 per sharpening, as compared to the present cost of $120 to replace a pair of dulled wear bars. This is a sizable savings.

The sharpening system of the present invention includes a sharpening tool, as described above, and a rotating power tool. The preferred rotating power tool is a hand held drill that includes a chuck, to which the shaft of the sharpening tool is attached. The chuck of the drill is the part that normally holds a drill bit and spins when the drill is in use. The shaft is gripped by the chuck just as the chuck would grip a drill bit. In this way, the shaft of the sharpening tool is spun rapidly when the drill is in use, just as a drill bit would be.

The kit of the present invention includes an embodiment of the sharpening tool, as described above, and a steering member having at least one wear rail. The steering member may be a snowmobile ski, ski runner, or wear bar upon which at least one wear rail is disposed. Some embodiments of the kit also include a separate stud sharpening tool for sharpening studs disposed upon snowmobile tracks.

Therefore, it is an aspect of the present invention to provide a sharpening tool for use with a conventional hand held drill.

It is a further aspect of the present invention to provide a sharpening tool capable of sharpening both wear rails and studs.

It is a further aspect of the present invention to provide a sharpening system that is the combination of the sharpening tool and a hand held drill or other rotating power tool.

It is a further aspect of the present invention to provide a kit for sharpening dull wear rails and studs, including the dull wear rails and studs and the sharpening tool of the present invention.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 1:
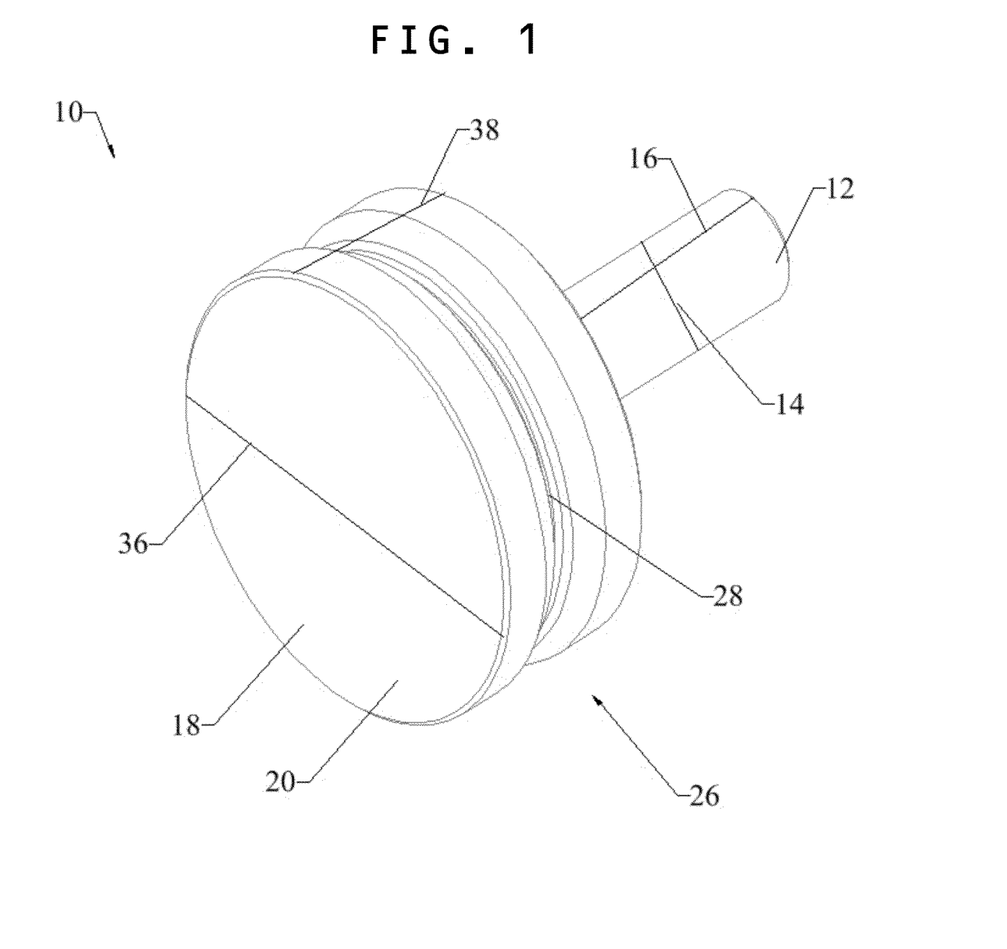
FIG. 1 is a perspective view of the preferred embodiment sharpening tool of the present invention with no stud sharpener.

Referring first to FIG. 1, a perspective view of sharpening tool 10 is shown. Sharpening tool 10 includes shaft 12 and cylindrical head 18. Cylindrical head 18 includes top face 20 and bottom face 22 (shown in FIG. 2A), opposite from top face 20. Shaft 12 extends from the center of bottom face 22. Shaft 12 preferably has length 16 of 1.3 inches and diameter 14 of 0.25 inches, although the length and diameter may be larger or smaller in some embodiments. Shaft 12 is dimensioned to attach to the chuck of a hand held drill or other rotating power tool. However, as noted above, in other embodiments, the shaft 12 may have a hexagonal cross section for attachment to a quick connect hex driver, such as those found on drywall screw guns, or may take other art recognized forms.

Figure 8:
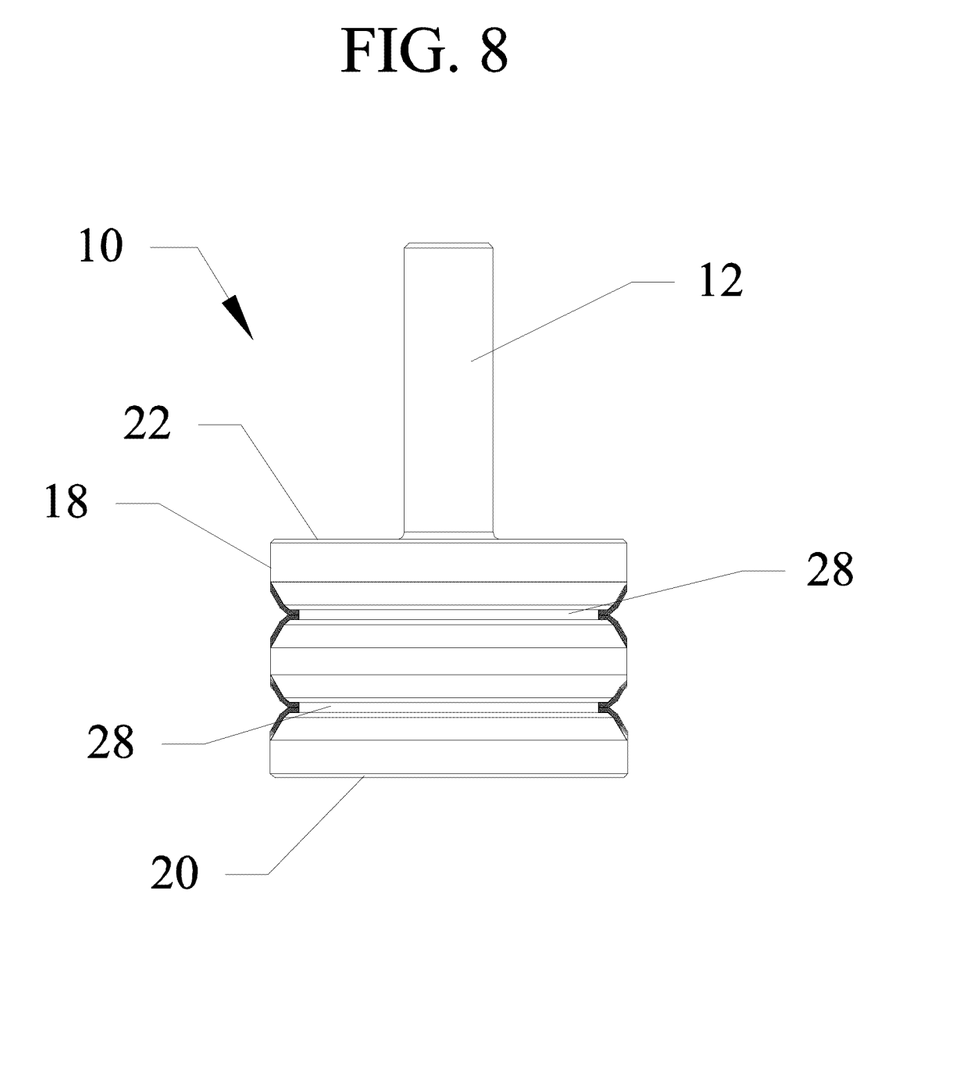
FIG. 8 is a side view of an embodiment of the sharpening tool of the present invention having multiple rail grooves.

Cylindrical head 18 has a round body 26 that extends between top and bottom faces 20, 22. Rail groove 28 extends around the circumference of round body 26. In embodiments of the sharpening tool 10 that have a single rail groove 28, the rail groove 28 is preferably disposed halfway between top and bottom faces 20, 22. However, the rail groove 28 may be disposed at any location between the top and bottom faces 20, 22. Further, as shown in FIG. 8, the sharpening tool 10 may include multiple rail grooves 28 disposed about the circumference of round body 26.

Cylindrical head 18 preferably has diameter 36 of 1.5 inches and width 38 of 0.637 inches. This diameter 36 is preferred as it produces a 6:1 speed ratio that allows the body 26 of the sharpening tool 10 to rotate at an adequate speed when used with slower conventional hand held drills, which typically rotate at speeds of between 1000 and 1500 RPM. However, in embodiments in which the sharpening tool 10 is used with rotating power tools that rotate at higher speeds, such as drywall screw guns or corded high speed drills, the diameter 36 of cylindrical head 18 may be reduced.

Figure 2A:
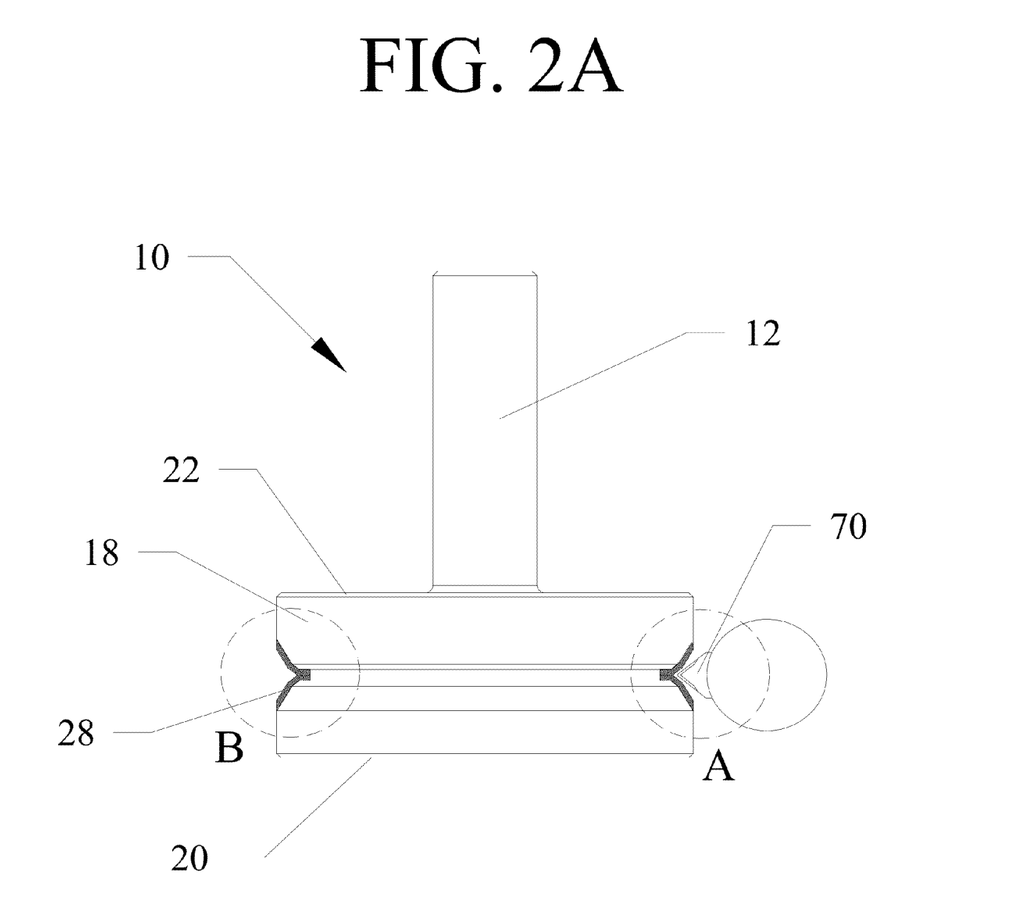
FIG. 2A is a side view of the one embodiment of the sharpening tool of the present invention.
Figure 2B:
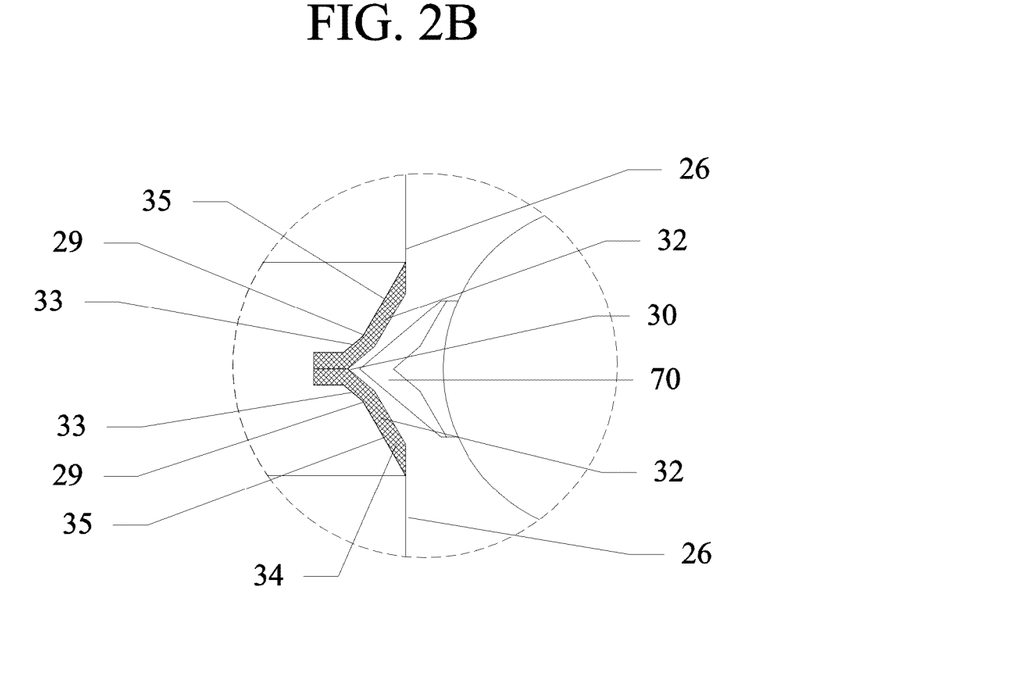
FIG. 2B is a blown up detail of section B of the view of FIG. 2A.
Figure 2C:
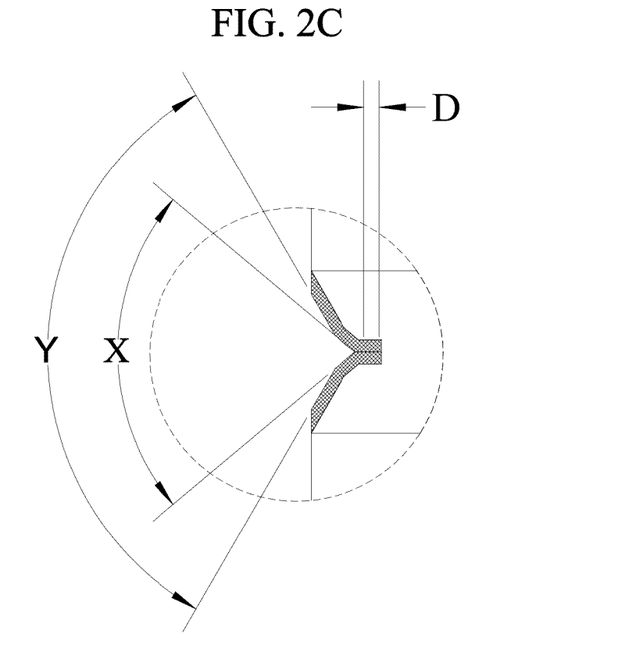
FIG. 2C is a blown up detail of section C of the view of FIG. 2A.

Now referring to FIGS. 2A-2C, a side view of one embodiment of the sharpening tool 10 is shown. Dull wear bar 70 is being placed in rail groove 28 for sharpening. Rail groove 28 includes two sets of angled surfaces 33, 35. Inner set of angled surfaces 33 forms an angle X of between 60° and 80°. Outer set of angled surfaces 35 intersects the inner set of angled surfaces 33 and forms a more obtuse angle Y of 120°. Outer set of angled surfaces 35 intersects the side of the round body 26. In this embodiment, the inner set of angled surfaces 33 intersects at point 30 such that the rail groove 28 is substantially V-shaped. Both sets of angled surfaces 33, 35 are coated in abrasive material 34, which is preferably diamond grit but may be other art recognized abrasive materials capable of sharpening carbide. Distance D represents how far abrasive material 34 is allowed to extend into rail groove 28, and is preferably no more than 0.039 inches.

Figure 3A:
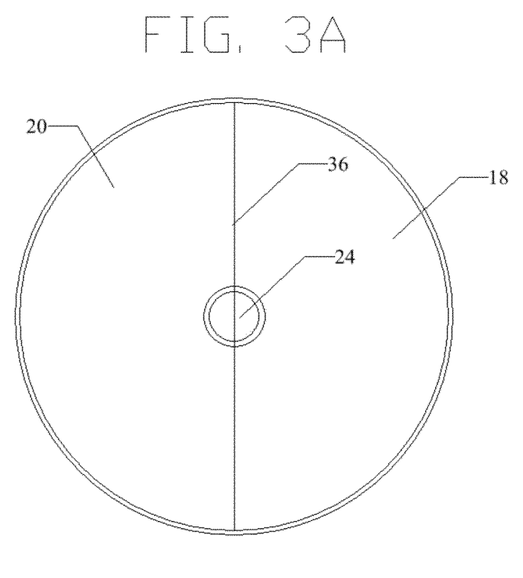
FIG. 3A is a top down view of the cylindrical head of the preferred embodiment of the sharpening tool of the present invention.

Now referring to FIGS. 3A through 3F, the preferred embodiment of the sharpening tool is shown. FIG. 3A is a top down view of cylindrical head 18 with diameter 36 and center 24. The lines indicating center 24 show approximately where shaft 12 is positioned on the other side of cylindrical head 18, although shaft 12 is not shown in this view, and it is understood that no such visible indication of center 24 is necessarily present.

Figure 3B:
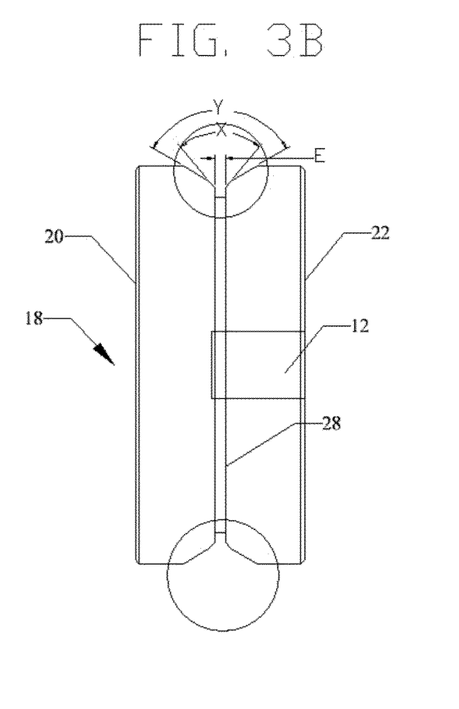
FIG. 3B is a side view of the cylindrical head of the preferred embodiment of the sharpening tool of the present invention.

FIG. 3B is a side view of cylindrical head 18 with top and bottom faces 20, 22 and a single rail groove 28 extending around the cylindrical head 18. The positioning of shaft 12 is again indicated although it is understood that this positioning of shaft 12 within cylindrical head 18 is not actually visible. Shaft 12 extends into cylindrical head 18 and is preferably affixed there by brazing. However, as noted above, shaft 12 may be formed or machined integral to the head 18 in some embodiments. Distance D, which is the preferred gap between the sides of rail groove 28, as explained below with reference to FIG. 3D, is preferably 0.035 inches.

Figure 3C:
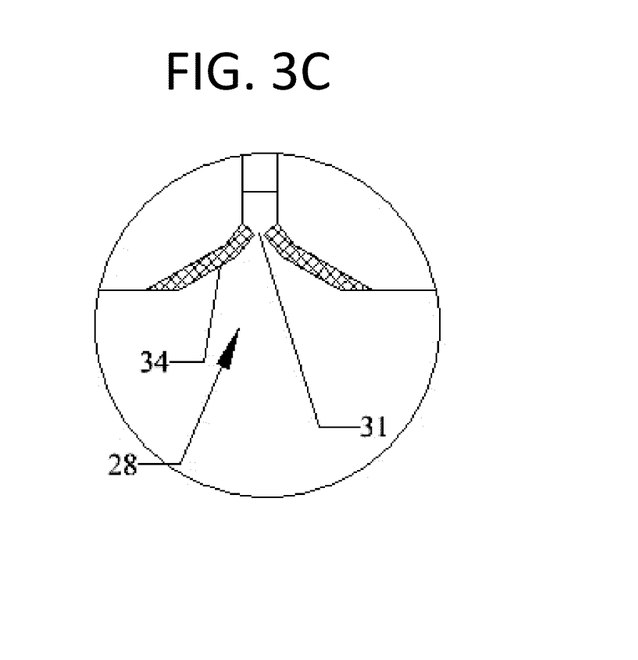
FIG. 3C is blown up details of the rail groove of the preferred embodiment of the sharpening tool of the present invention.

FIG. 3C is a blown up detail of rail groove 28. FIG. 3C shows the preferred embodiment of rail groove 28, which is identical to what is described with reference to FIGS. 2A-2C except that surface 32 does not extend all the way into distance D. Instead, point 30 is replaced by a small gap 31 leading into distance D within rail groove 28. This embodiment is preferred as it allows the tip of the wear rail to fit within the gap 31 and not be flattened during sharpening. It also saves on the amount of abrasive material 34 necessary and makes manufacture of sharpening tool 10 easier and less expensive. Although the embodiments of FIGS. 2A-2C and 3A-3F each show a rail groove 28 with two sets of angled surfaces 33, 35, it is recognized that a single set of angled surfaces may be utilized to achieve acceptable results. However, the use of two sets of angled surfaces 33, 35 produces superior results and is preferred.

Figure 3D:
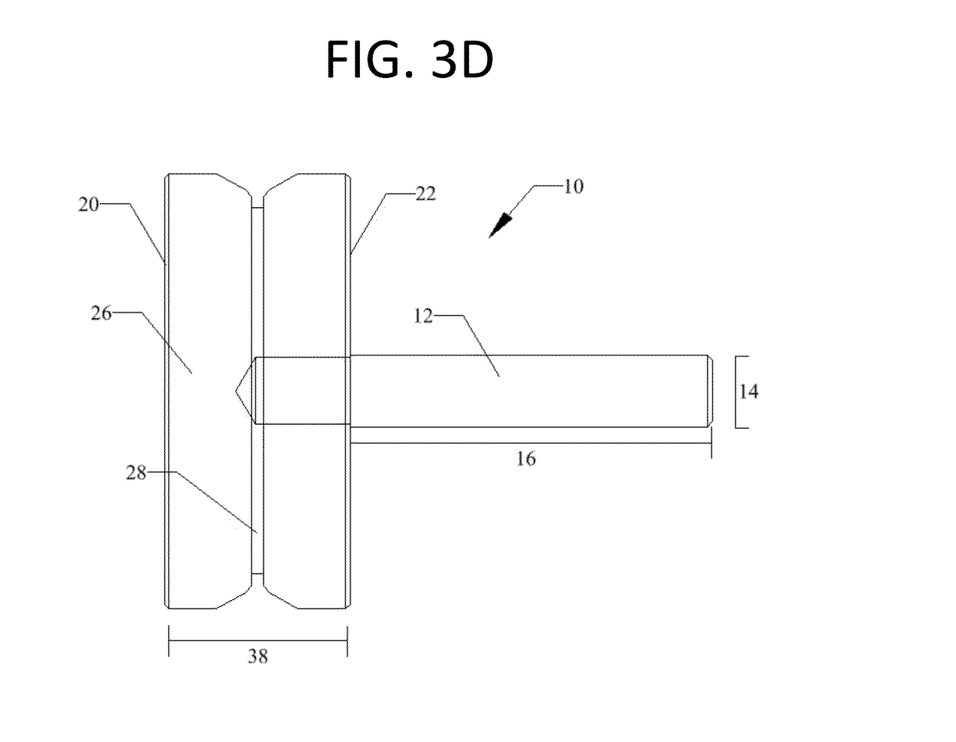
FIG. 3D is a side diagram of the preferred embodiment of the sharpening tool of the present invention.
Figure 3E:
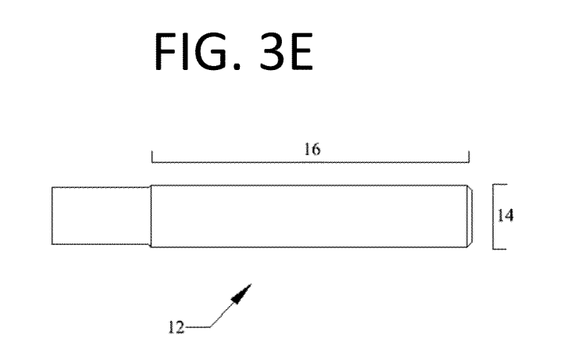
FIG. 3E is a side view of the shaft of the preferred embodiment of the sharpening tool of the present invention.
Figure 3F:
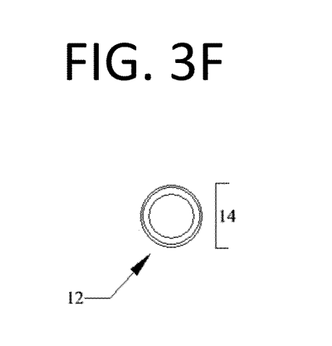
FIG. 3F is a top down view of the shaft of the preferred embodiment of the sharpening tool of the present invention.

FIG. 3D is a side diagram of sharpening tool 10 of the present invention. The insertion of shaft 12 into cylindrical head 18 is shown. FIG. 3D shows the width 38 of the cylindrical head 18 and a variation on shaft 12 where the tip inserted into cylindrical head 18 is pointed. Shaft 12 has length 16 of 1.3 inches, and diameter 14 of 0.375 inches. Again, the lines indicating the portion of shaft 12 inserted into cylindrical head 18 are for illustrative purposes only and are understood to not be actually visible. This portion of the shaft 12 has a length of approximately 0.4 inches. FIG. 3E is a side view of shaft 12 when not inserted into cylindrical head 18. Unlike shaft 12 shown in FIG. 3D, the top of the portion of shaft 12 in FIG. 3E that will be inserted into cylindrical head 18 is flat rather than pointed. Length 16 and diameter 14 are again indicated. FIG. 3F is a top down view of shaft 12 showing diameter 14.

Now referring to FIGS. 4A and 4B, a prior art dual rail wear bar 70 is shown with and without the application of sharpening tool 10, respectively. In FIG. 4B, sharpening tool 10 is applied to one wear rail 72 of wear bar 70. Although not visible from this perspective, wear rail 72 is inserted into rail groove 28 of sharpening tool 28 and sharpened against abrasive material 34.

Figure 5:
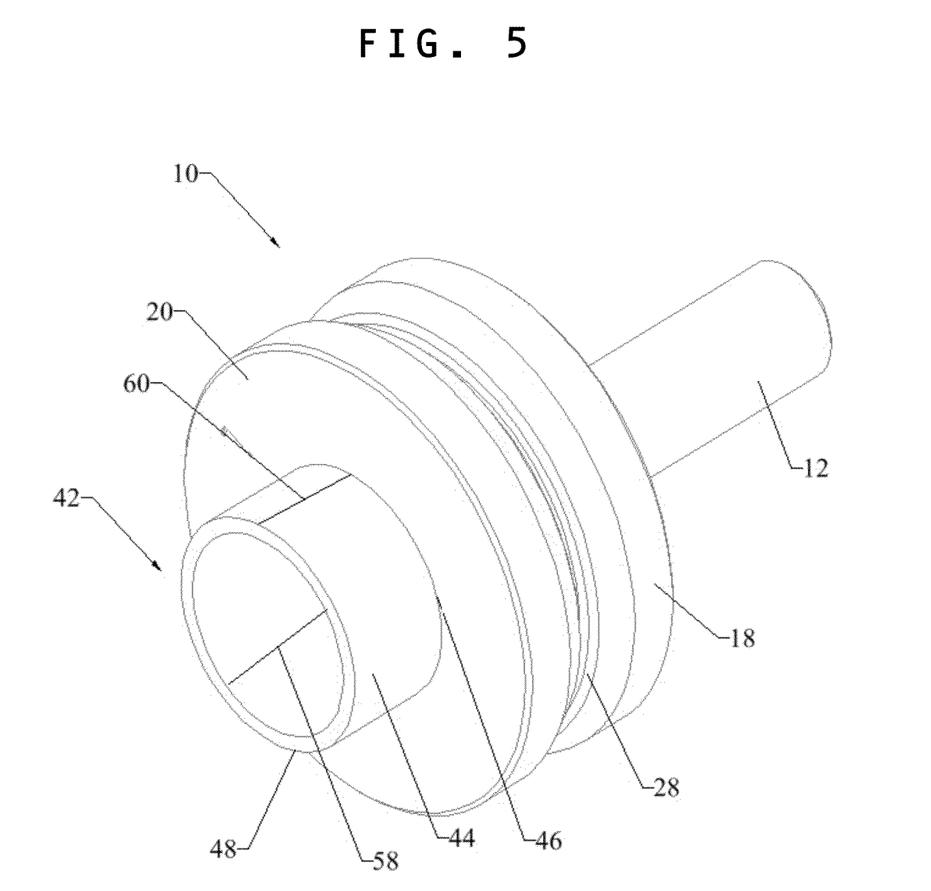
FIG. 5 is a perspective view of an embodiment of the sharpening tool of the present invention with a stud sharpener.
Figure 6:
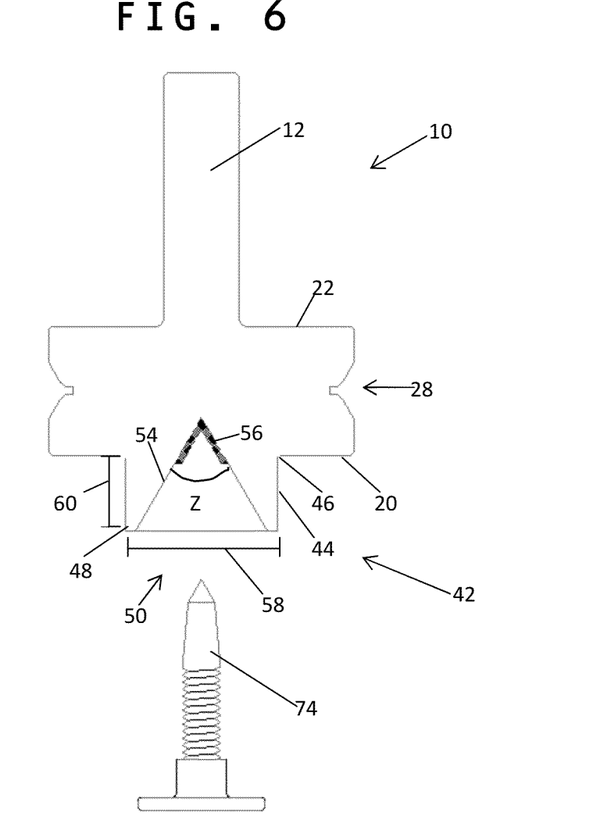
FIG. 6 is a cutaway side view of an embodiment of the sharpening tool of the present invention with a stud sharpener and a stud to be applied to the stud sharpener.

Now referring to FIGS. 5 and 6, sharpening tool 10 including stud sharpener 42 is provided. Stud sharpener 42 has tube body 44 with first end 46 extending from top face 20 of cylindrical head 18 and second end 48. Tube body 44 has length 60 of 0.5 inches and diameter 58 of 0.75 inches. Dull stud 74 is inserted into tube body 44 for sharpening. As shown in FIG. 6, the inside of tube body 44 includes stud groove 50. Stud groove 50 includes a surface 54 with an abrasive material 56 against which a stud may be sharpened. As was the case with the abrasive material 34 disposed in the rail groove 28, abrasive material 56 is preferably 40/50 diamond grit. Stud groove 50 includes angle Z at the point of stud groove 50, which is approximately 60°. Stud groove 50 extends into cylindrical head 18, piercing the plane of top face 20. In other embodiments, stud groove 50 does not extend so far and is included within length 60 of tube body 44 so that stud groove 50 does not pierce the plane of top face 20.

Figure 7A:
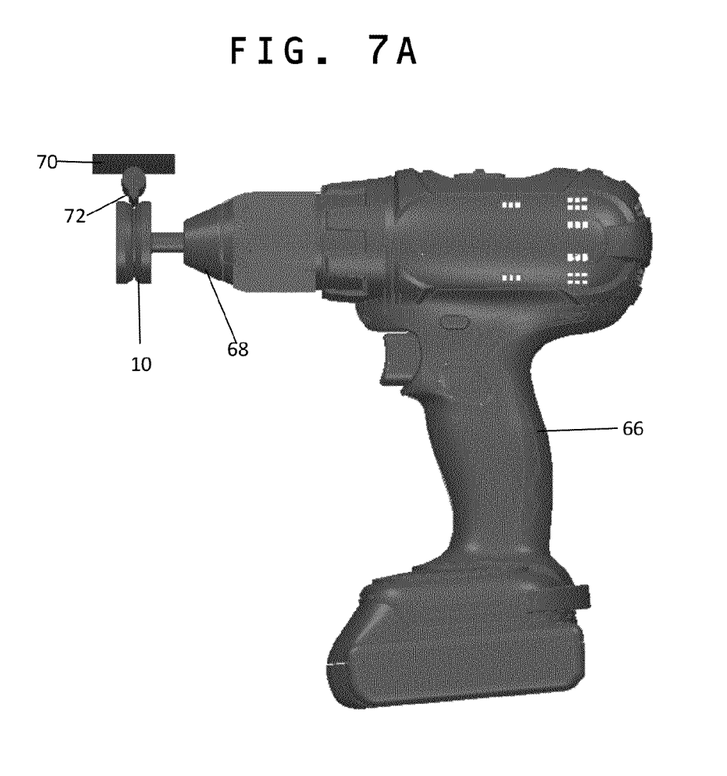
FIG. 7A is a side view of one embodiment the sharpening tool attached to a hand held drill and applied to a wear bar having a single wear rail to be sharpened.
Figure 7B:
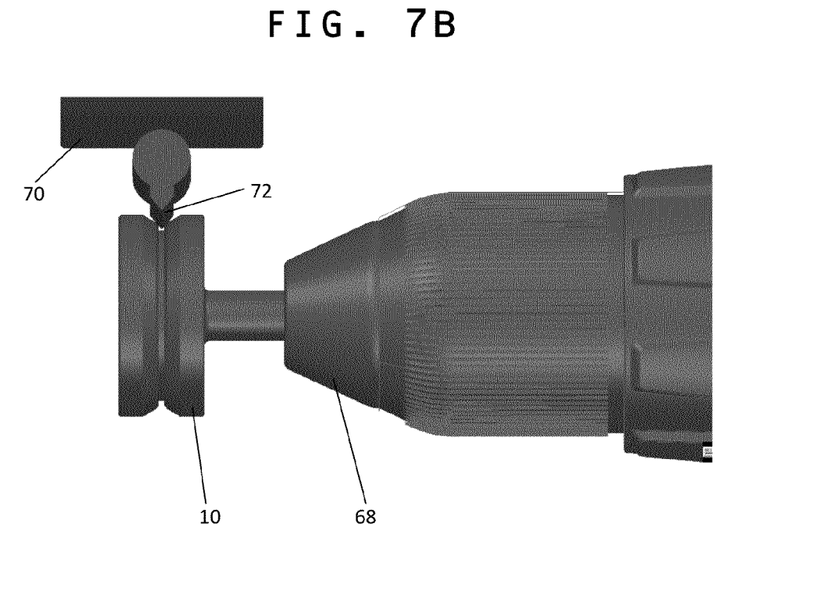
FIG. 7B is a close up side view of FIG. 7A.
Figure 7C:
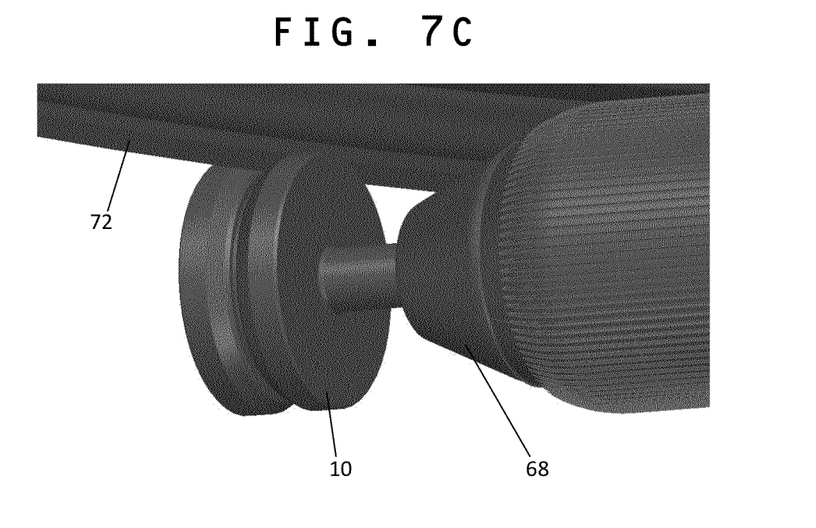
FIG. 7C is a close up perspective view of FIG. 7A.
Figure 7D:
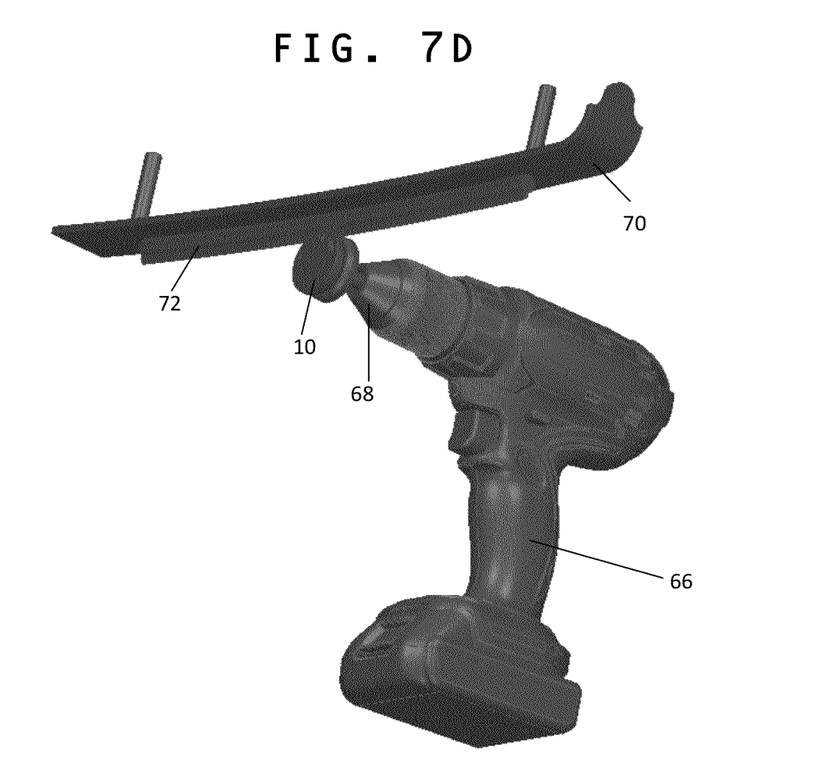
FIG. 7D is a perspective view of FIG. 7A showing the entire wear bar.

Now referring to FIGS. 7A through 7D, views of sharpening tool 10 attached to hand held drill 66 are shown. As shown most clearly in FIGS. 7B and 7C, sharpening tool 10 is attached to chuck 68 of hand held drill 66. Chuck 68 grips shaft 12 of sharpening tool 10 as it would a drill bit so that sharpening tool 10 spins rapidly like a drill bit when hand held drill 66 is operated. FIG. 7D demonstrates how sharpening tool 10 may be easily applied to dull wear rail 72 when sharpening tool 10 is attached to hand held drill 66 as shown.

Referring now to FIG. 8, some embodiments of the sharpening tool 10 include multiple rail grooves 28 disposed about the cylindrical head 18. In the embodiment of FIG. 8, two rail grooves 28 are disposed between the top surface 20 and bottom surface 22 of the head 18. This arrangement allows the life of the sharpening tool 10 to be doubled as, once the abrasive material in one rail groove 28 is no longer effective, the user may use the other rail groove 28. Although only two rail grooves 28 are shown, it is recognized that more than two rail grooves 28 may be disposed about the head 18.

It is envisioned that the sharpening tool 10 of the present invention will be sold as a standalone product. However, it is also recognized that the sharpening tool may be sold as a part of a sharpening system that includes the sharpening tool 10 and a rotating power tool, such as the hand held drill 66 shown in FIGS. 7A-7D. In addition, it may be sold as part of a kit that includes the sharpening tool 10 and a steering member having at least one wear rail. The steering member may be a snowmobile ski, ski runner, or a wear bar, such as those shown in FIGS. 7A-7D, upon which at least one wear rail 72 is disposed.

Figure 9:
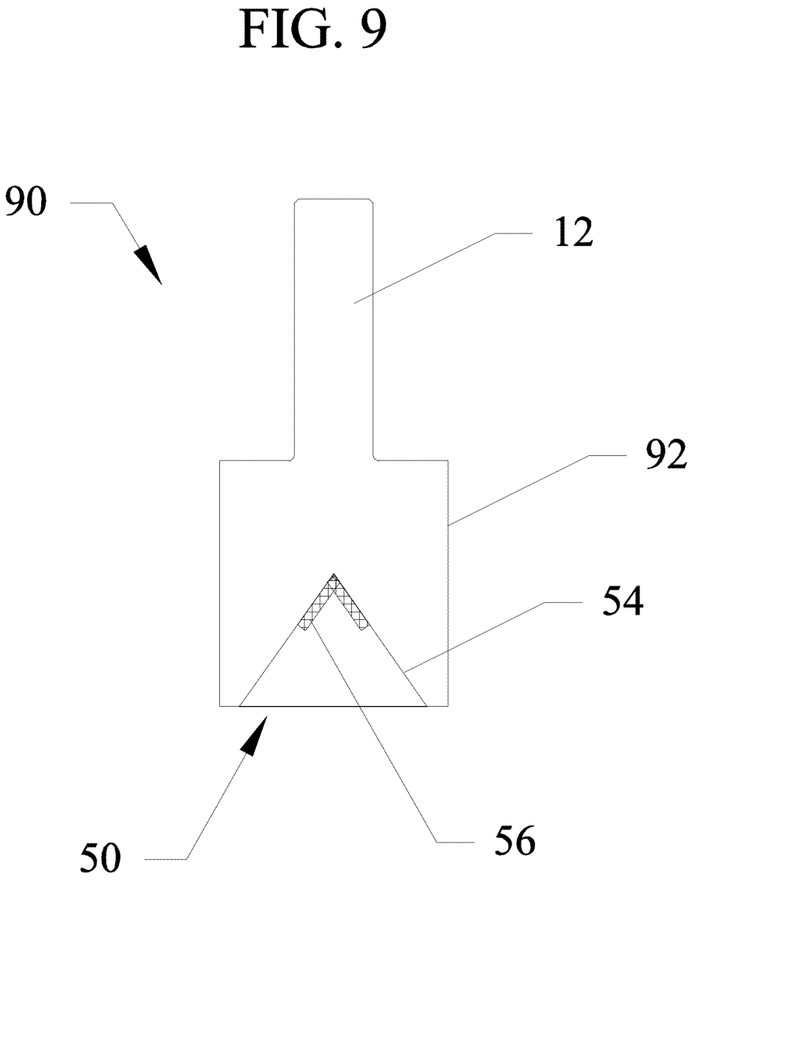
FIG. 9 is a cutaway side view of a stud sharpener that is part of some embodiments of the kit of the present invention.

Some embodiments of the kit also include a separate stud sharpening tool for sharpening studs disposed upon snowmobile tracks. One embodiment of such as stud sharpener tool 90 is shown in FIG. 9. The stud sharpening tool 90 includes a shaft 12 and a cylindrical body 92 into which a stud groove 50 is formed. Stud groove 50 includes a surface 54 with an abrasive material 56 against which a stud may be sharpened. It is preferred that the stud sharpening tool 90 be substantially similar to the stud sharpener 42 described with reference to FIGS. 5 and 6. However, it is recognized that other art recognized stud sharpening tools may be utilized to achieve similar results.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A sharpening tool for sharpening carbide wear rails, said sharpening tool comprising:
   a shaft dimensioned for attachment to a rotating power tool; and
   a substantially cylindrical head extending from said shaft, said head comprising:
   a top face;
   a bottom face, wherein said shaft extends from a center of said bottom face;
   a round body extending between said top face and said bottom face; and
   at least one rail groove extending around a circumference of said round body between said top face and said bottom face, wherein:
   said rail groove comprises at least one set of angled surfaces; and
   an abrasive material is disposed upon each of said at least one set of angled surfaces of said rail groove;
   wherein said at least one set of angled surfaces of said rail groove comprises an inner set of angled surfaces and an outer set of angled surfaces, wherein said inner set of angles surfaces form and included angle of between 60° and 80° and said outer set of angles surfaces form an included angle of substantially 120°.

2. The sharpening tool as claimed in claim 1, wherein said abrasive material is a diamond material.

3. The sharpening tool as claimed in claim 1, wherein said shaft has a diameter of 0.25 inches and said round body of said cylindrical head has a diameter of 1.5 inches.

4. A sharpening tool for sharpening carbide wear rails, and said sharpening tool comprising:
   a shaft dimensioned for attachment to a rotating power tool; and
   a substantially cylindrical head extending from said shaft, said head comprising:
   a top face;
   a bottom face, wherein said shaft extends from a center of said bottom face;
   a round body extending between said top face and said bottom face; and
   at least one rail groove extending around a circumference of said round body between said top face and said bottom face, wherein:
   said rail groove comprises at least one set of angled surfaces; and
   an abrasive material is disposed upon each of said at least one set of angled surfaces of said rail groove;
   a stud sharpener comprising:
   a tube body extending from said top face of said cylindrical head, wherein said tube body comprises a first end in communication with said top face of said cylindrical head and a second end; and
   a stud groove disposed at said first end of said tube body, wherein:
   said stud groove is V-shaped;
   said stud groove comprises a surface; and
   an abrasive material is disposed upon said surface of said stud groove.

5. The sharpening tool as claimed in claim 4, wherein said abrasive material disposed upon said surface of said stud groove is the same abrasive material that is disposed upon each set of angled surfaces of said rail groove.

6. The sharpening tool as claimed in claim 4, wherein said tube body of said stud sharpener has a diameter of 0.5 inches and a length of 0.75 inches.

7. The sharpening tool as claimed in claim 4, wherein said v-shaped stud groove comprises a first angle of 60° at a point of said v-shaped stud groove.

8. The sharpening tool as claimed in claim 1 wherein said at least one rail groove extending around a circumference of said round body between said top face and said bottom face comprises at least two rail grooves extending around a circumference of said round body between said top face and said bottom face.

9. A sharpening system for sharpening snowmobile carbide wear rails, comprising:
   a rotating power tool; and
   a sharpening tool comprising:
   a shaft dimensioned for attachment to a rotating power tool; and
   a substantially cylindrical head extending from said shaft, said head comprising:
   a top face;
   a bottom face, wherein said shaft extends from a center of said bottom face;
   a round body extending between said top face and said bottom face; and
   at least one rail groove extending around a circumference of said round body between said top face and said bottom face, wherein:
   said rail groove comprises at least one set of angled surfaces and
   an abrasive material is disposed upon each of said at least one set of angled surfaces of said rail groove;
   wherein said at least one set of angled surfaces of said rail groove of said sharpening tool comprises an inner set of angled surfaces and an outer set of angled surfaces, wherein said inner set of angled surfaces form an included angle of between 60° and 80° and said outer set of angled surfaces form an included angled of substantially 120°.

10. The sharpening system as claimed in claim 9, wherein said rotating power tool is a hand held drill having a chuck.

11. The sharpening system as claimed in claim 9, wherein said sharpening tool further comprises a stud sharpener comprising:
   a tube body extending from said top face of said cylindrical head of said first sharpening tool, wherein said tube body comprises a first end in communication with said top face of said cylindrical head and a second end;
   a stud groove disposed at said first end of said tube body, wherein:
   said stud groove is V-shaped;
   said stud groove comprises a surface; and
   an abrasive material is disposed upon said surface of said stud groove.

12. The sharpening system as claimed in claim 11, wherein said tube body of said stud sharpener of said sharpening tool has a diameter of ½ inch and a length of ¾ inches.

13. The sharpening system as claimed in claim 11, wherein said v-shaped stud groove of said stud sharpener of said first sharpening tool comprises a first angle of 60° at a point of said v-shaped stud groove.

14. The sharpening system as claimed in claim 9, wherein said at least one rail groove extends around a circumference of said round body of said sharpening tool between said top face and said bottom face comprises at least two rail grooves extending around a circumference of said round body of said sharpening tool between said top face and said bottom face.

15. A kit of parts comprising:
   a steering member comprising at least one carbide wear rail; and
   a sharpening tool comprising:
      a shaft dimensioned for attachment to a rotating power tool; and
      a substantially cylindrical head extending from said shaft, said head comprising:
         a top face;
         a bottom face, wherein said shaft extends from a center of said bottom face;
         a round body extending between said top face and said bottom face; and
         at least one rail groove extending around a circumference of said round body between said top face and said bottom face, wherein:
            said rail groove comprises at least one set of angled surfaces and
            an abrasive material is disposed upon each set of angled surfaces of said rail groove.

16. The kit of parts as claimed in claim 15, wherein said sharpening tool further comprises a stud sharpener comprising:
   a tube body extending from said top face of said cylindrical head of said first sharpening tool, wherein said tube body comprises a first end in communication with said top face of said cylindrical head and a second end;
   a stud groove disposed at said first end of said tube body, wherein:
      said stud groove is v-shaped;
      said stud groove comprises a surface; and
      an abrasive material is disposed upon said surface of said stud groove.

17. The kit of parts as claimed in claim 15, wherein said steering member comprises a wear bar.

18. The kit of parts as claimed in claim 15, further comprising a stud sharpening tool comprising:
   a shaft dimensioned for attachment to a rotating power tool; and
   a substantially cylindrical head extending from said shaft, said head comprising:
      a stud groove disposed into said cylindrical head, wherein:
         said stud groove is V-shaped;
         said stud groove comprises a surface; and
         an abrasive material is disposed upon said surface of said stud groove.

19. The sharpening tool as claimed in claim 4 wherein said at least one rail groove extending around a circumference of said round body between said top face and said bottom face comprises at least two rail grooves extending around a circumference of said round body between said top face and said bottom face.

* * * * *